United States Patent
He et al.

(10) Patent No.: US 11,034,876 B1
(45) Date of Patent: Jun. 15, 2021

(54) CALCIUM-RESISTANT ZWITTERIONIC POLYMER, PREPARATION METHOD AND APPLICATION THEREOF, AND WATER-BASED DRILLING FLUID CONTAINING POLYMER AS DISPERSANT

(71) Applicant: China University of Petroleum (Beijing), Beijing (CN)

(72) Inventors: Yinbo He, Beijing (CN); Guancheng Jiang, Beijing (CN); Tengfei Dong, Beijing (CN); Lili Yang, Beijing (CN); Wuquan Li, Beijing (CN); Haiyang Liu, Beijing (CN); Xiaoqing Li, Beijing (CN); Xuwu Luo, Karamay (CN); Li Zhao, Karamay (CN); Xianbin Huang, Qingdao (CN); Jingping Liu, Qingdao (CN); Jingen Deng, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

(21) Appl. No.: 17/153,260

(22) Filed: Jan. 20, 2021

(30) Foreign Application Priority Data

Jan. 21, 2020 (CN) .......................... 202010071615.9

(51) Int. Cl.
*C09K 8/24* (2006.01)
*C08F 220/58* (2006.01)
(Continued)

(52) U.S. Cl.
CPC .............. *C09K 8/24* (2013.01); *C08F 212/30* (2020.02); *C08F 220/585* (2020.02); *C08F 228/02* (2013.01); *C08F 2800/20* (2013.01)

(58) Field of Classification Search
CPC . C09K 8/02; C09K 8/03; C09K 8/032; C09K 8/035; C09K 8/04; C09K 8/05;
(Continued)

(56) References Cited

U.S. PATENT DOCUMENTS

| | | | |
|---|---|---|---|
| 5,270,382 A | 12/1993 | Ahmed et al. | |
| 2014/0350205 A1* | 11/2014 | Lerch | C08F 220/36 526/287 |
| 2017/0183558 A1* | 6/2017 | Funkhouser | C09K 8/487 |

FOREIGN PATENT DOCUMENTS

| | | |
|---|---|---|
| CN | 106366243 A | 2/2017 |
| CN | 110016325 A | 7/2019 |
| CN | 110229270 A | 9/2019 |

OTHER PUBLICATIONS

Grooth, et al., "Building Polyzwitterion-Based Multilayers for Responsive Membranes", Langmuir, 30, pp. 5152-5161, Apr. 21, 2014. (Year: 2014).*

(Continued)

*Primary Examiner* — Christopher M Rodd
(74) *Attorney, Agent, or Firm* — Calfee Halter & Griswold LLP

(57) ABSTRACT

The invention discloses a calcium-resistant zwitterionic polymer, a preparation method and an application thereof, and a water-based drilling fluid containing the polymer as a dispersing agent, wherein the polymer contains a structural unit A, a structural unit B and a structural unit C, and the structural unit A is at least one selected from the group consisting of structural units with a structure shown in a formula (11), a structure shown in a formula (12) and a structure shown in a formula (13); the structural unit B is a structural unit with a structure shown in a formula (2); the structural unit C is at least one selected from the group consisting of structural units having a structure represented by formula (31) and a structure represented by formula (32); the weight-average molecular weight of the polymer is 350,000 to 600,000.

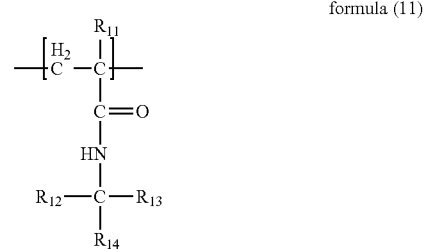

formula (11)

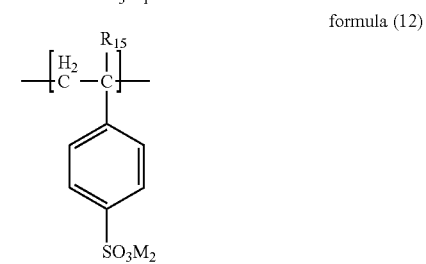

formula (12)

formula (13)

formula (2)

(Continued)

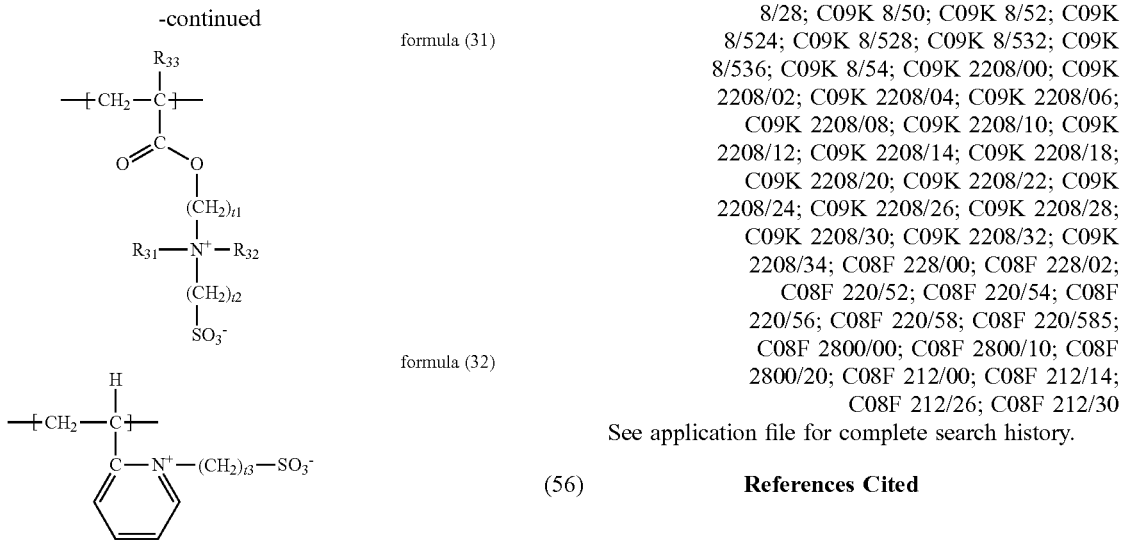

formula (31)

formula (32)

12 Claims, 1 Drawing Sheet

(51) Int. Cl.
*C08F 228/02* (2006.01)
*C08F 212/14* (2006.01)

(58) Field of Classification Search
CPC ... C09K 8/06; C09K 8/08; C09K 8/10; C09K 8/12; C09K 8/14; C09K 8/145; C09K 8/16; C09K 8/18; C09K 8/20; C09K 8/203; C09K 8/206; C09K 8/22; C09K 8/24; C09K 8/26; C09K 8/265; C09K 8/28; C09K 8/50; C09K 8/52; C09K 8/524; C09K 8/528; C09K 8/532; C09K 8/536; C09K 8/54; C09K 2208/00; C09K 2208/02; C09K 2208/04; C09K 2208/06; C09K 2208/08; C09K 2208/10; C09K 2208/12; C09K 2208/14; C09K 2208/18; C09K 2208/20; C09K 2208/22; C09K 2208/24; C09K 2208/26; C09K 2208/28; C09K 2208/30; C09K 2208/32; C09K 2208/34; C08F 228/00; C08F 228/02; C08F 220/52; C08F 220/54; C08F 220/56; C08F 220/58; C08F 220/585; C08F 2800/00; C08F 2800/10; C08F 2800/20; C08F 212/00; C08F 212/14; C08F 212/26; C08F 212/30

See application file for complete search history.

(56) References Cited

OTHER PUBLICATIONS

Diao, et al., "Reversibly highly stretchable and self-healable zwitterion containing polyelectrolyte hydrogel with high ionic conductivity for high-performance flexible and cold-resistant supercapacitor", Journal of Applied Polymer Science, 137, e48995, Jan. 20, 2020. (Year: 2020).*

"Drilling Fluid Completion Fluid" vol. 36, No. 6; Nov. 30, 2019; Chu Qi et al., Synthesis and performance evaluation of low-viscosity cut-lifting agent for water-based drilling fluid, pp. 689-693.

"Journal of Petroleum Science and Engineering" vol. 173; Oct. 24, 2018; Qi Chu et al., Synthesis and properties of an improved agent with restricted viscosity and shearing strength in water-based drilling fluid, pp. 1254-1263.

* cited by examiner

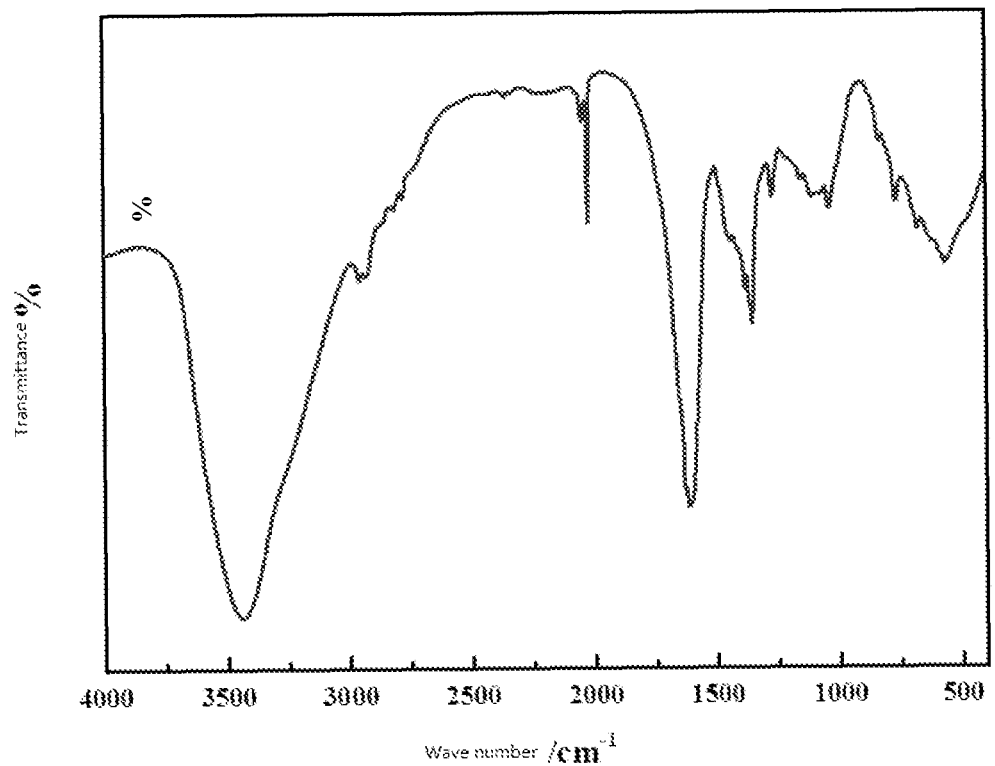

CALCIUM-RESISTANT ZWITTERIONIC POLYMER, PREPARATION METHOD AND APPLICATION THEREOF, AND WATER-BASED DRILLING FLUID CONTAINING POLYMER AS DISPERSANT

CROSS-REFERENCE TO RELATED APPLICATION

This application is based on, and claims the benefit of, Chinese Patent Application Serial No. 202010071615.9, filed Jan. 21, 2020, the entire disclosure of which is incorporated herein by reference.

FIELD

The invention relates to the technical field of oil and gas drilling, in particular to a polymer, a method for preparing the polymer, a polymer prepared by the method, application of the polymer in drilling fluid and the drilling fluid containing the polymer.

BACKGROUND

Drilling fluid is a circulating flushing medium used in the drilling process, called as the 'blood' of drilling, and has multiple functions of suspending and carrying drill cuttings, preventing the borehole wall from collapsing, protecting oil and gas reservoir, cooling and lubricating drilling tools, transferring pump power, recording geological data and the like, and is an important factor influencing the success and the drilling speed of the drilling.

For water-based drilling fluids, calcium resistance is one of the technical problems to be solved urgently, and the calcium resistance has not been solved well for a long time. The dehydration effect of calcium ions can compress the diffusion electric double layer of colloids such as clay and the like, so that the problems of excessive flocculation, great increase of viscosity and gel strength, rapid increase of filtration loss and the like of the drilling fluid are caused, and In severe cases, the water-based drilling fluid cannot be normally used.

In order to address the problem of calcium invasion in water-based drilling fluids, researchers have found that the use of dispersants with strongly hydration groups, such as sulfonated phenolic resins, sulfonated tannins, and the like, in water-based drilling fluids is one of the effective methods. However, the method has the defects that the environmental protection performance of the dispersing agent is poor, and the dispersing agent is easy to lose efficacy in a high-concentration calcium ion environment. In addition, although the polymer dispersant has good dispersing performance, environmental protection performance and the function of reducing the filtration loss, most polymers are easy to be aggregated and precipitated by calcium ions after being ionized in the drilling fluid, resulting in poor solubility even ilavailability, and which is particularly serious under the high-temperature condition.

Therefore, the development of a new dispersant capable of realizing effective dispersion of the high-calcium water-based drilling fluid has important practical significance.

SUMMARY

The present invention aims to overcome the defects of over flocculation, large filtration loss and poor dispersibility caused by the dehydration effect of calcium ions in the high-calcium water-based drilling fluid in the prior art.

In order to achieve the above object, the present invention provides in a first aspect a calcium-resistant zwitterionic polymer comprising structural unit A, structural unit B and structural unit C, the structural unit A is at least one selected from the group consisting of structural units having a structure represented by formula (11), a structure represented by formula (12), and a structure represented by formula (13); the structural unit B is a structural unit with a structure shown in a formula (2); the structural unit C is at least one selected from the group consisting of structural units having a structure represented by formula (31) and a structure represented by formula (32); the weight-average molecular weight of the polymer is 350,000 to 600,000;

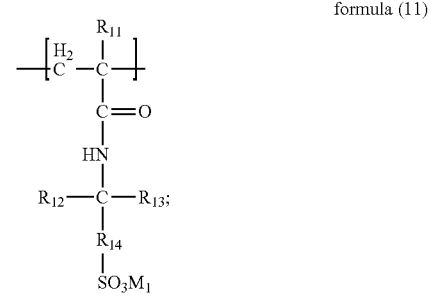

formula (11)

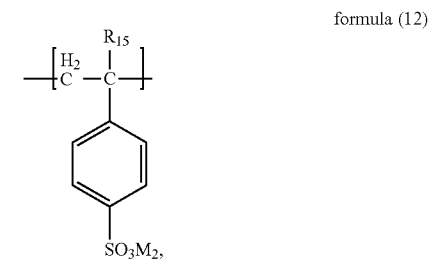

formula (12)

formula (13)

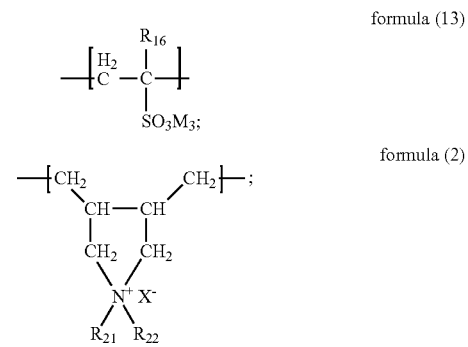

formula (2)

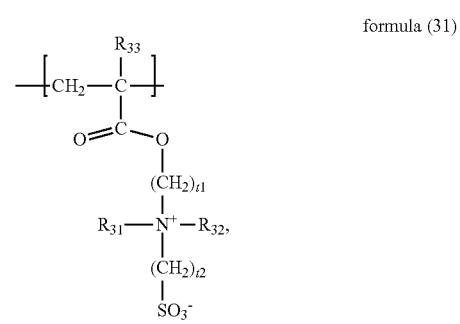

formula (31)

formula (32)

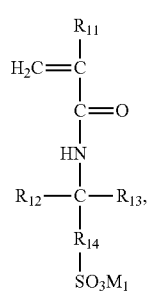

wherein, in the formula (11), the formula (12) and the formula (13), $R_{11}$, $R_{12}$, $R_{13}$, $R_{15}$ and $R_{16}$ are respectively and independently selected from H and $C_1$-$C_4$ alkyl, $R_{14}$ is selected from $C_1$-$C_4$ alkylene, $M_1$, $M_2$ and $M_3$ are respectively and independently Na or K;

in the formula (2), $R_{21}$ and $R_{22}$ are respectively and independently selected from $C_1$-$C_4$ alkyl, and $X^-$ is selected from $Cl^-$, $Br^-$, and $I^-$;

in the formula (31) and the formula (32), $R_{31}$ and $R_{32}$ are respectively and independently selected from $C_1$-$C_4$ alkyl, $R_{33}$ is selected from H and $C_1$-$C_4$ alkyl, and t1, t2 and t3 are respectively and independently integers of 1 to 6.

In a second aspect, the present invention provides a method of preparing a calcium-resistant zwitterionic polymer, the method comprises:

carrying out polymerization reaction on each component in a polymeric composition in the presence of a cosolvent, a chain transfer agent and an initiator in an aqueous solvent and a protective atmosphere, wherein the polymeric composition contains a monomer A', a monomer B' and a monomer C';

the monomer A' is at least one selected from the group consisting of monomers having a structure represented by formula (I1), a structure represented by formula (I2), and a structure represented by formula (I3); the monomer B' is a monomer with a structure shown in a formula (II); the monomer C' is at least one selected from monomers with a structure shown in a formula (III1) and a structure shown in a formula (III2);

the monomer A', the monomer B' and the monomer C' are respectively such that the polymer contains a structural unit A, a structural unit B and a structural unit C, wherein the structural unit A is at least one selected from the group consisting of structural units having a structure represented by formula (11), a structure represented by formula (12) and a structure represented by formula (13); the structural unit B is a structural unit with a structure shown in a formula (2); the structural unit C is at least one selected from the group consisting of structural units having a structure represented by formula (31) and a structure represented by formula (32); the amount of the polymeric composition used is such that the weight-average molecular weight of the polymer obtained is from 350,000 to 600,000;

formula (I1)

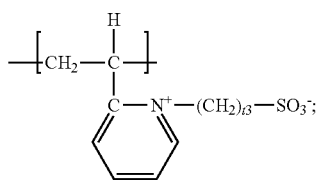

formula (I2)

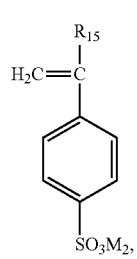

formula (I3)

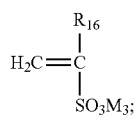

formula (II)

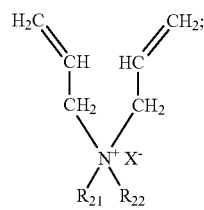

formula (III1)

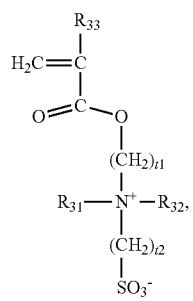

formula (III2)

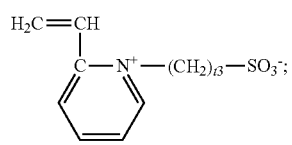

formula (11)

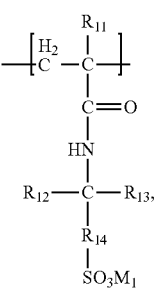

formula (12)

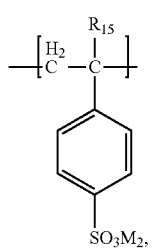

-continued

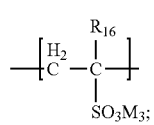

formula (13)

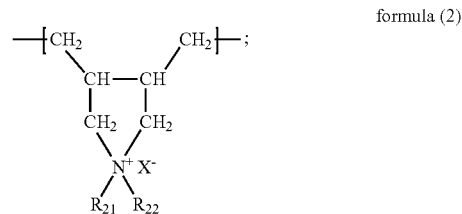

formula (2)

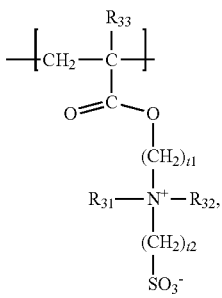

formula (31)

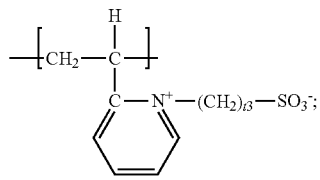

formula (32)

wherein, the definition of each group is the same as that of the definition in the preceding paragraph of the present invention.

In a third aspect, the present invention provides a polymer obtainable by the process of the second aspect described above.

In a fourth aspect the present invention provides the use of a polymer according to the first or third aspects above in a water-based drilling fluid.

In a fifth aspect the invention provides a water-based drilling fluid containing a polymer described in the first or third aspects above as a dispersant.

The polymer provided by the invention at least has the following advantages:

(1) when the polymer provided by the invention is used for a water-based drilling fluid dispersant, the polymer has good compatibility with calcium salt, can maintain good hydration dispersion in a high-calcium environment, can be preferentially adsorbed to bentonite, weakens the dehydration effect of calcium ions on the bentonite, plays a good dispersing role, reduces the filtration loss of the water-based drilling fluid and improves the stability of the drilling fluid;

(2) the polymer provided by the invention has lower molecular weight and weak viscosifying effect, so that the polymer can be used in large quantity to disperse drilling fluid and cope with the conditions of high calcium and ultrahigh calcium of water-based drilling fluid;

(3) the preparation method provided by the invention can obtain a high-concentration polymer solution, the polymer solution can be directly utilized after synthesis, no post-treatment is needed, and the polymer solution is easy to disperse during use, so that the preparation efficiency of the drilling fluid can be increased.

The additional features and advantages of the invention will be specified in the subsequent content in the detailed description.

DRAWINGS

FIG. 1 is an infrared spectrum of the polymer prepared in example 1.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In the invention, the $C_1$-$C_4$ alkyl refers to alkyl with 1 to 4 carbon atoms; the $C_1$-$C_4$ alkylene refers to alkylene with 1-4 carbon atoms. Integers from 1 to 6 include 1, 2, 3, 4, 5 and 6, and integers from 1 to 5 include 1, 2, 3, 4 and 5.

In the present invention, the $C_1$ to $C_4$ alkyl group may include, but is not limited to: methyl, ethyl, n-propyl, isopropyl, n-butyl, sec-butyl, isobutyl and tert-butyl.

In the present invention, the alkylene group refers to a residue of an alkane which has been deprived of two hydrogen atoms, which may be two hydrogen atoms on the same carbon atom or two hydrogen atoms on different carbon atoms, and may be linear or branched, for example, the ethylene group may be —$CH_2CH_2$— or —CH($CH_3$)—.

In the present invention, the $C_1$ to $C_4$ alkylene group may include, but is not limited to: methylene, ethylene, n-propylene, isopropylene, n-butylene, sec-butylene, isobutylene, tert-butylene.

In the present invention, the $C_1$ to $C_3$ alkylene group may include, but is not limited to: methylene, ethylene, n-propylene, isopropylene.

As described above, a first aspect of the present invention provides a calcium-resistant zwitterionic polymer, the polymer contains a structural unit A, a structural unit B and a structural unit C, the structural unit A is at least one selected from the group consisting of structural units having a structure represented by formula (11), a structure represented by formula (12), and a structure represented by formula (13); the structural unit B is a structural unit with a structure shown in a formula (2); the structural unit C is at least one selected from the group consisting of structural units having a structure represented by formula (31) and a structure represented by formula (32); the weight-average molecular weight of the polymer is 350,000 to 600,000;

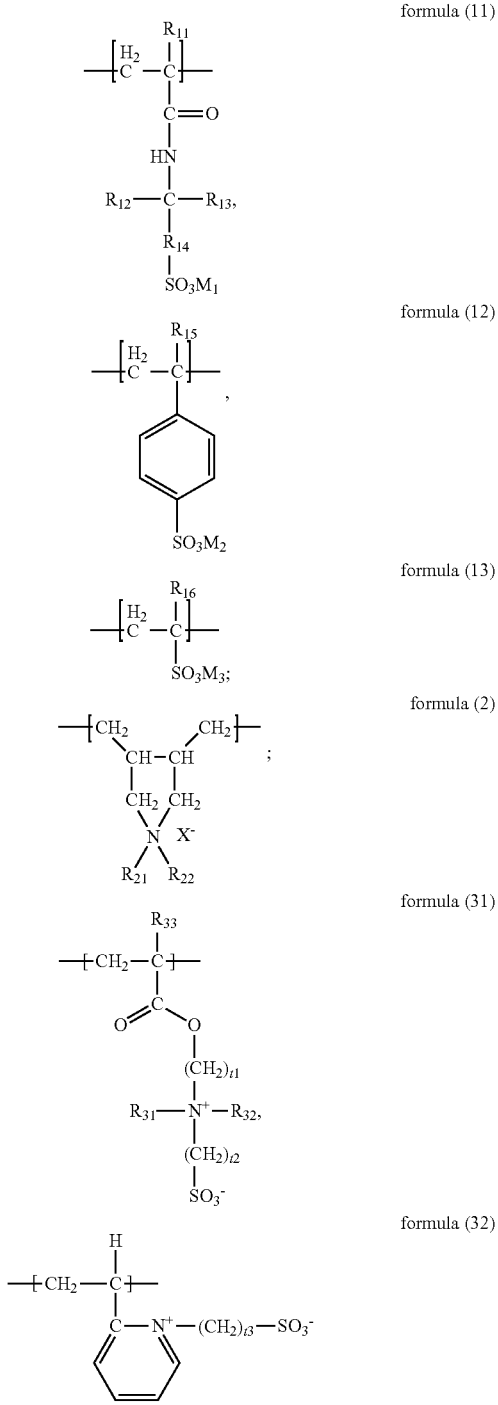

formula (11)

formula (12)

formula (13)

formula (2)

formula (31)

formula (32)

wherein, in the formula (11), the formula (12) and the formula (13), $R_{11}$, $R_{12}$, $R_{13}$, $R_{15}$ and $R_{16}$ are respectively and independently selected from H and $C_1$-$C_4$ alkyl, $R_{14}$ is selected from $C_1$-$C_4$ alkylene, $M_1$, $M_2$ and $M_3$ are respectively and independently Na or K;

in the formula (2), $R_{21}$ and $R_{22}$ are respectively and independently selected from $C_1$-$C_4$ alkyl, and $X^-$ is selected from $Cl^-$, $Br^-$, and $I^-$;

in the formula (31) and the formula (32), $R_{31}$ and $R_{32}$ are respectively and independently selected from $C_1$-$C_4$ alkyl, $R_{33}$ is selected from H and $C_1$-$C_4$ alkyl of, and t1, t2 and t3 are respectively and independently integers of 1 to 6.

According to a preferred embodiment of the present invention, in formula (11), formula (12) and formula (13), $R_{11}$, $R_{12}$, $R_{13}$, $R_{15}$ and $R_{16}$ are respectively and independently selected from H, methyl, ethyl, n-propyl and isopropyl, $R_{14}$ is selected from $C_1$-$C_3$ alkylene, $M_1$, $M_2$, $M_3$ are respectively and independently Na or K;

in formula (2), $R_{21}$ and $R_{22}$ are respectively and independently selected from methyl, ethyl, n-propyl and isopropyl, and $X^-$ is $Cl^-$ or $Br^-$;

in formula (31) and formula (32), $R_{31}$, $R_{32}$, and $R_{33}$ are respectively and independently selected from methyl, ethyl, n-propyl, and isopropyl, and t1, t2, and t3 are respectively and independently integers of 1 to 5.

According to another more preferred embodiment of the present invention, the structural unit A is at least one selected from the group consisting of structural units having a structure represented by formula (14), a structure represented by formula (15), and a structure represented by formula (16); the structural unit B is a structural unit with a structure shown in a formula (4); the structural unit C is at least one selected from the group consisting of structural units having a structure represented by formula (51), a structure represented by formula (52), and a structure represented by formula (53);

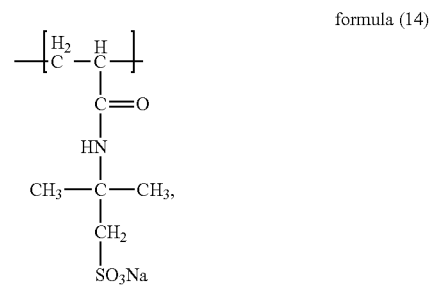

formula (14)

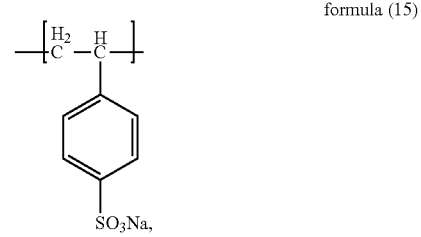

formula (15)

formula (16)

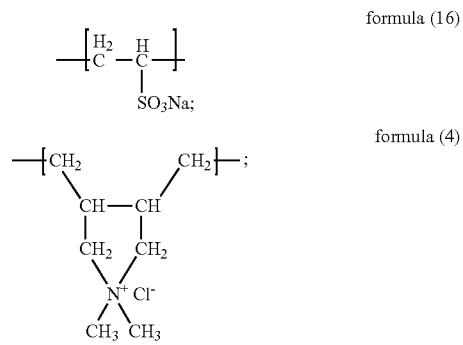

formula (4)

-continued

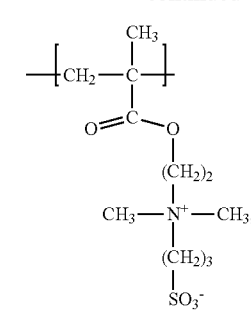
formula (51)

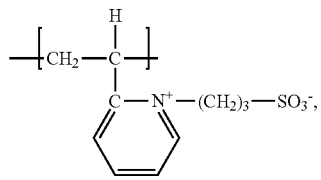
formula (52)

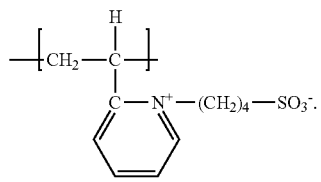
formula (53)

Preferably, the content of the structural unit A is 53.4 wt % to 84.6 wt % based on the total weight of the polymer; the content of the structural unit B is 8.2 wt % to 25.0 wt %; the content of the structural unit C is 7.1 wt % to 21.6 wt %, so that the polymer has more excellent dispersion performance when used in a water-based drilling fluid, and the obtained water-based drilling fluid has better calcium resistance and higher stability.

In order to obtain a water-based drilling fluid with better calcium resistance when used in the water-based drilling fluid, the weight-average molecular weight of the polymer is preferably 400,000 to 600,000.

As previously mentioned, a second aspect of the invention provides a method of preparing a calcium-resistant zwitterionic polymer, the method comprises:

carrying out polymerization reaction on each component in a polymeric composition in the presence of a cosolvent, a chain transfer agent and an initiator in an aqueous solvent and a protective atmosphere, wherein the polymeric composition contains a monomer A', a monomer B' and a monomer C';

the monomer A' is at least one selected from the group consisting of monomers having a structure represented by formula (I1), a structure represented by formula (I2), and a structure represented by formula (I3); the monomer B' is a monomer with a structure shown in a formula (II); the monomer C' is at least one selected from monomers with a structure shown in a formula (III1) and a structure shown in a formula (III2);

the monomer A', the monomer B' and the monomer C' are respectively such that the polymer contains a structural unit A, a structural unit B and a structural unit C, wherein the structural unit A is at least one selected from the group consisting of structural units having a structure represented by formula (11), a structure represented by formula (12) and a structure represented by formula (13); the structural unit B is a structural unit with a structure shown in a formula (2); the structural unit C is at least one selected from the group consisting of structural units having a structure represented by formula (31) and a structure represented by formula (32); the amount of the polymeric composition used is such that the weight-average molecular weight of the polymer obtained is 350,000 to 600,000;

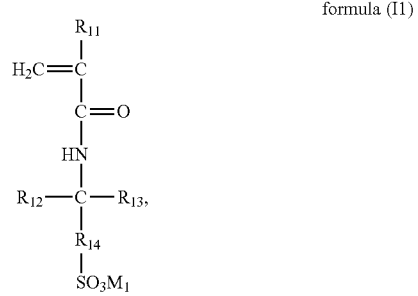
formula (I1)

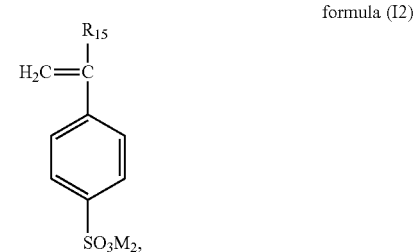
formula (I2)

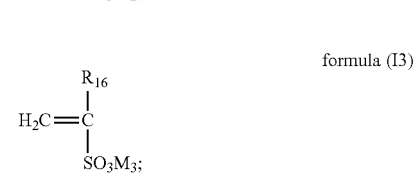
formula (I3)

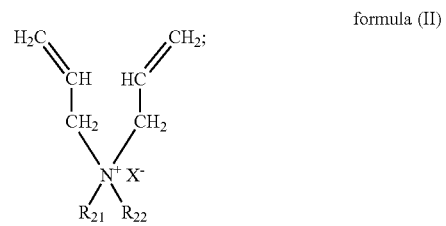
formula (II)

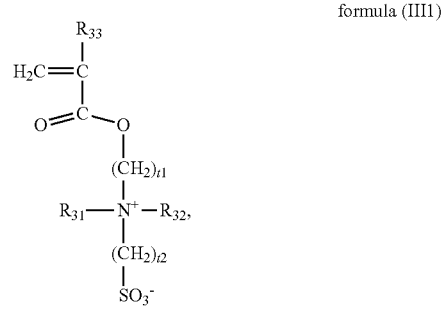
formula (III1)

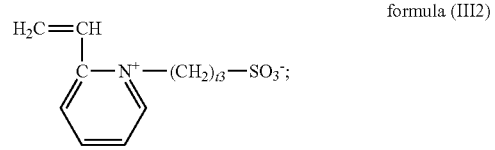
formula (III2)

-continued

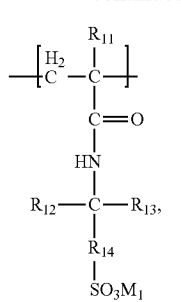
formula (11)

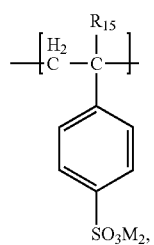
formula (12)

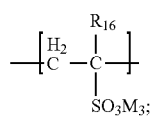
formula (13)

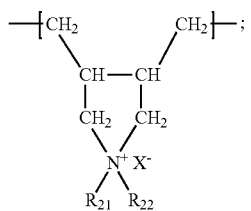
formula (2)

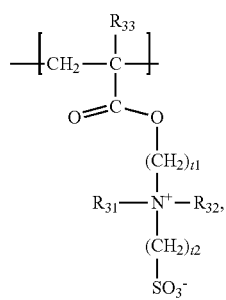
formula (31)

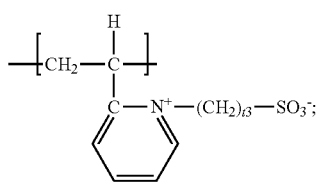
formula (32)

wherein the definitions of each group correspond to the above-mentioned definitions.

In the method according to the second aspect of the present invention, the monomer having a structure represented by formula (I1), the monomer having a structure represented by formula (I2), the monomer having a structure represented by formula (I3), the monomer having a structure represented by formula (II), the monomer having a structure represented by formula (III1), or the monomer having a structure represented by formula (III2); and the relevant definitions and substance types of the substituents in the structural unit of the structure shown in the formula (11), the structural unit of the structure shown in the formula (12), the structural unit of the structure shown in the formula (13), the structural unit of the structure shown in the formula (2), the structural unit of the structure shown in the formula (31) and the structural unit of the structure shown in the formula (32) are the same as those of the substituents described above in the invention, and the description is omitted here, and a person skilled in the art should not be construed as a limitation to the technical solution of the invention.

In the present invention, the monomer A', the monomer B' and the monomer C' may be obtained commercially, or may be synthesized according to the structural formula provided in the present invention in combination with a known method in the field of organic synthesis.

In the present invention, it should be noted that the monomer is converted into the corresponding structural unit contained in the polymer approximately completely, and the amount of the monomer used may be the same as the content of the corresponding structural unit contained in the polymer.

In order to obtain a polymer with more excellent dispersion performance when used in a water-based drilling fluid, the monomer A' is preferably at least one selected from the group consisting of monomers having a structure represented by formula (I4), a structure represented by formula (I5), and a structure represented by formula (I6); the monomer B' is a monomer with a structure shown in a formula (IV); the monomer C' is at least one selected from the group consisting of monomers having a structure represented by formula (V1), a structure represented by formula (V2) and a structure represented by formula (V3);

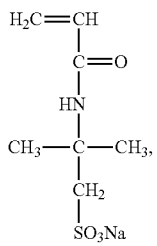
formula (I4)

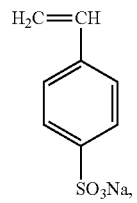
formula (I5)

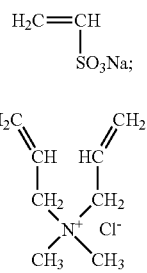
formula (I6)

formula (IV)

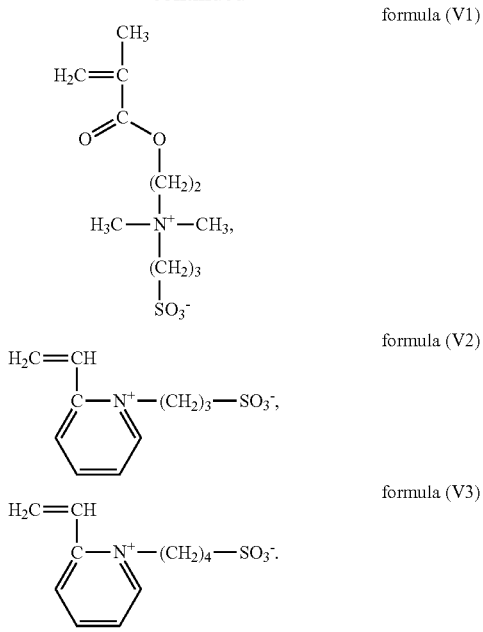

formula (V1)

formula (V2)

formula (V3)

Preferably, the monomers A', the monomer B' and the monomer C' are used in such an amount that the polymer obtained has a content of the structural unit A of 53.4 wt % to 84.6 wt %; the content of the structural unit B is 8.2 wt % to 25.0 wt %; the content of the structural unit C is 7.1 wt % to 21.6 wt %, based on the total weight of the polymer, so that the polymer obtained has more excellent dispersion performance when used for water-based drilling fluid, and the obtained water-based drilling fluid has better calcium resistance and higher stability.

In order to obtain a water-based drilling fluid with better calcium resistance when used in a water-based drilling fluid, the polymeric composition is preferably used in an amount such that the weight-average molecular weight of the obtained polymer is between 400,000 to 600,000.

Preferably, the cosolvent is selected from at least one of soluble salts, more preferably, the cosolvent is selected from at least one of ammonium chloride, sodium chloride and potassium chloride.

Preferably, the chain transfer agent is selected from at least one of sodium formate, potassium formate, sodium acetate and potassium acetate.

Preferably, the initiator is selected from at least one of azo initiators, peroxide initiators, and redox initiators; the azo initiator is selected from at least one of azobisisobutyramidine hydrochloride, azobisdiisopropylimidazoline hydrochloride, azobiscyanovaleric acid and azobisisopropylimidazoline; the peroxide initiator is at least one selected from hydrogen peroxide, ammonium persulfate, sodium persulfate and potassium persulfate; the redox initiator is selected from at least one of persulfate-sulfite, persulfate-thiourea and persulfate-organic salt, and more preferably, the initiator is selected from potassium persulfate and/or 2,2'-azobis[2-methylpropionamidine] dihydrochloride hydrochloride.

In the present invention, the chain transfer agent is used in an amount of 0.2 wt % to 0.3 wt % and the initiator is used in an amount of 0.3 wt % to 0.5 wt %, based on the total amount of the polymerization composition.

In the present invention, the aqueous solvent may be pure distilled water and/or deionized water, or may be a mixed solvent containing distilled water and/or deionized water.

Preferably, the polymeric composition is used in an amount of 30 wt % to 50 wt % based on the amount of the aqueous solvent.

Preferably, the cosolvent is used in an amount of 8 wt % to 10 wt % based on the amount of the aqueous solvent.

Preferably, the conditions of the polymerization reaction include: a temperature of 45° C. to 75° C., and a time of 7 to 10 h.

In the present invention, the polymerization reaction is carried out under a protective atmosphere, which is preferably nitrogen.

In the present invention, according to a preferred embodiment, the method for preparing the polymer comprises the following steps.

(1) adding the monomer A', the monomer B' and the monomer C' into a three-neck flask containing distilled water, and stirring until the monomers are uniformly mixed, wherein the total using amount of the monomers is 30 wt % to 50 wt % based on the using amount of the distilled water;

(2) adding a cosolvent, a chain transfer agent and an initiator into the aqueous solution obtained in the step (1), and uniformly stirring;

(3) and after the addition is finished, sealing the three-neck flask, adding a nitrogen introducing device, introducing nitrogen into the three-neck flask, fully removing air in the flask, heating to 45° C. to 75° C. to perform polymerization reaction for 7-10 hours, and cooling to room temperature after the reaction is finished to obtain a solution containing the polymer.

The preparation method provided by the invention can obtain a high-concentration polymer solution, the polymer solution can be directly used after synthesis, no post-treatment is needed, the dispersion is easy during use, and the preparation efficiency of the drilling fluid can be increased.

As previously mentioned, a third aspect of the present invention provides a polymer obtainable by the method of the second aspect described above.

In accordance with a fourth aspect of the present invention, there is provided the use of the polymer according to the first or third aspects described above in a water-based drilling fluid.

In the present invention, preferably, the application is the use of the polymer as a dispersant for water-based drilling fluids.

The specific application method of the polymer used as the dispersant of the water-based drilling fluid is well known to those skilled in the art, and the detailed description of the invention is omitted here.

When the polymer is used as a dispersant of water-based drilling fluid, the 'dehydration effect' of calcium ions on bentonite can be weakened, a good dispersing effect is achieved, the filtration loss of the water-based drilling fluid is reduced, and the stability of the drilling fluid is improved; meanwhile, the polymer has a small viscosifying effect, can be used in a large amount to cope with the high-calcium condition of the water-based drilling fluid, and plays an excellent dispersing role.

In accordance with a fifth aspect of the present invention, there is provided a water-based drilling fluid containing the polymer described in the first or third aspects above as a dispersant.

According to a preferred embodiment of the invention, the water-based drilling fluid further comprises bentonite, calcium chloride, white asphalt, barite and water.

Preferably, in the water-based drilling fluid, relative to 100 parts by weight of water, the content of the bentonite is 1 to 2 parts by weight, the content of the calcium chloride is 10 to 15 parts by weight, the content of the white asphalt is 1 to 3 parts by weight, the content of the barite is 150 to 180 parts by weight, and the content of the polymer is 2.5 to 3 parts by weight.

In the present invention, there is no particular limitation on the preparation method of the water-based drilling fluid, and the preparation method known to those skilled in the art can be adopted, and the present invention is not described herein in detail, and the present invention is exemplified by a specific operation hereinafter, and those skilled in the art should not be construed as limiting the present invention.

In the present invention, unless otherwise specified, room temperature means 25±5° C.

In the present invention, the amount of the polymer is not particularly limited, and when the amount is used, the amount is based on the dry amount of the polymer.

The present invention will be described in detail below by way of examples. In the following examples, all the raw materials used are commercially available unless otherwise specified.

In the following examples, the test methods for the properties involved are as follows:

1. observation of appearance state of polymer: the appearance state was observed by naked eyes under natural light conditions;
2. structural characterization of the polymers: the infrared spectroscopy test was carried out for characterization to obtain the compound;
3. evaluation of Polymer Dispersion Property: the dispersion performance of the polymer was evaluated by high-calcium bentonite base mud, the high-calcium bentonite base mud contains water, bentonite and calcium chloride, and the formula of the high-calcium bentonite base mud was as follows: 100 parts by weight of water, 4 parts by weight of bentonite and 4 parts by weight of calcium chloride, and the specific process comprised the following steps:

300 mL of high-calcium bentonite base mud was taken, 1.5 parts by weight of polymer was added into 100 parts by weight of water, and the mixture was stirred at a high speed for 10 minutes by a stirrer under the condition of 3000 r/min to obtain the drilling fluid base mud.

3.1 viscosity determination: the viscosity index indicator was measured by a six-speed viscometer (model ZNN-D6B) of Qingdao Tongchun Petroleum instruments Company at room temperature, and specifically comprised the following steps: the drilling fluid base mud was poured into a viscosity measuring cup and #6, #3 were read sequentially at room temperature using a six-speed viscometer.

3.2 measurement of filtration loss: the drilling fluid loss rate was measured by a drilling fluid loss rate tester of SD6 model of Qingdao Tongchun Petroleum instrument Company, and specifically comprised the following steps: pouring the drilling fluid base mud into a filter loss measuring cup, added a sealing ring and covered API filter paper, sealed by using a filter screen, introduced nitrogen, measured the total volume of filtrate of the drilling fluid base mud within 7.5 min by using a drilling fluid water loss measuring instrument under the pressure of 0.69 MPa, and multiplied by 2 to obtain the API Filter Loss ($FL_{API}$) of the drilling fluid base mud.

4. Evaluation of Water-based drilling fluid Performance

The polymers obtained in the following examples were formulated into water-based drilling fluids and the properties of the water-based drilling fluids were evaluated as follows: 100 parts by weight of water+1 part by weight of bentonite+3 parts by weight of polymer+15 parts by weight of calcium chloride+3 parts by weight of white asphalt+150 parts by weight of barite.

The preparation process of the water-based drilling fluid comprises the following steps: sequentially added bentonite, polymer, calcium chloride, white asphalt and barite into water, and stirring for 5-10 min by using a high-speed stirrer after adding each raw material until the raw materials were uniformly dispersed, wherein the stirring speed was 10000-12000 rpm, so as to obtain the water-based drilling fluid.

4.1 viscosity determination: the Apparent Viscosity (AV), the Plastic Viscosity (PV), the dynamic shear force (YP), $\phi 6$ and $\phi 3$, the initial gel strength and the final gel strength of the water-based drilling fluid were measured by a six-speed viscometer, and the specific method was as follows:

the water-based drilling fluid was poured into a viscosity measuring cup and sequentially read $\phi 600$, $\phi 300$, $\phi 6$, $\phi 3$ by using a six-speed viscometer at room temperature.

The AV was calculated as follows:

$$AV=0.5\times\phi 600$$

PV was calculated as follows:

$$PV=\phi 600-\phi 300$$

YP was calculated as follows:

$$YP=0.51\times(2\times\phi 300-\phi 600)$$

the initial gel strength was calculated as follows: stirring at 600 r/min for 10 s, standing for 10 s, took the maximum reading of $\phi 3$, and dividing the maximum reading by 2 to obtain the initial gel strength.

The final gel strength was calculated as follows: stirred at 600 r/min for 10 s, standed for 10 min, took the maximum reading of $\phi 3$, and divided the maximum reading by 2 to obtain the final gel strength.

4.2 temperature resistance measurement: the temperature resistance of the water-based drilling fluid was evaluated by a roller heating furnace, and the specific method comprised the following steps:

aged the drilling fluid after the viscosity test was finished in a roller heating furnace at 150° C. for 16 h, cooled to room temperature after aged, and measured AV, PV, YP, $\phi 6$ and, $\phi 3$, initial gel strength and final gel strength of the aged water-based drilling fluid according to a method of 3.1.

4.3 high-temperature and high-pressure filtration loss measurement: the high-temperature and high-pressure Filtration Loss (FLHTHP) of the water-based drilling fluid was measured by a drilling fluid high-temperature and high-pressure water loss measuring instrument of GGS42-2A model of Qingdao Tongchun Petroleum instruments Company, and the specific method comprised the following steps:

added the aged water-based drilling fluid into a high-temperature and high-pressure filtration loss measuring cup, covered filter paper and a filter screen, sealed, introduced 0.7 MPa of nitrogen back pressure, and pressurized to 4.2 MPa after the temperature of the instrument was raised to 150° C. And kept the pressure in the measuring cup unchanged at 3.5 MPa, tested the total volume of the filtrate of the water-based drilling fluid within 30 min, and multiplied by 2 to obtain the FLHTHP.

In the following examples, each part by weight means 5 g unless otherwise specified.

Example 1

(1) Added a polymer composition (58.32 g of monomer A', 15.12 g of monomer B' and 6.56 g of monomer C') into a three-neck flask containing 200 g of distilled water, heated in a water bath at 25° C., and stirred until the monomers were uniformly mixed, wherein the monomer A' was sodium 2-acrylamido-2-methylpropanesulfonate with a structure shown as a formula (I4); the monomer B' was diallyl dimethyl ammonium chloride with a structure shown in a formula (IV); the monomer C' is methacryloyl ethyl sulfobetaine with a structure shown in a formula (VI);

(2) added 20 g of sodium chloride, 0.24 g of sodium formate and 0.4 g of potassium persulfate into the aqueous solution obtained in the step (1), and uniformly stirring;

(3) and after the addition was finished, sealed the three-neck flask, added a nitrogen introducing device to introduce nitrogen into the three-neck flask, fully removing air in the flask, heated to 70° C., carried out constant-temperature polymerization for 8 hours, and cooled to room temperature after the reaction is finished to obtain a polymer S1.

The content of the structural unit A in the polymer Si was 72.9 wt % based on the total weight of the polymer Si; the content of the structural unit B was 18.9 wt %; the content of the structural unit C was 8.2 wt %, and the weight-average molecular weight was 550,000.

Examples 2 to 3

A polymer was prepared in a similar manner to example 1, except that: the same procedure as in example 1 was repeated except that the kind of the monomer A' used was changed to give polymers S2 and S3, specifically:

example 2: the same mass of the monomer A' having a structure represented by the formula (I5) was used in place of the monomer A' in example 1 to give a polymer S2;

based on the total weight of the polymer S2, the content of the structural unit A in the polymer S2 was 72.9 wt %; the content of the structural unit B was 18.9 wt %; the content of the structural unit C was 8.2 wt %, and the weight-average molecular weight was 510,000.

Example 3: the same mass of the monomer A' having a structure represented by the formula (I6) was used in place of the monomer A' in example 1 to give a polymer S3;

based on the total weight of the polymer S3, the content of the structural unit A in the polymer S3 was 72.9 wt %; the content of the structural unit B was 18.9 wt %; the content of the structural unit C was 8.2 wt %, and the weight-average molecular weight was 480,000.

Examples 4 to 6

A polymer was prepared in a similar manner to example 1, except that: the amount of each monomer was varied, and the rest was the same as in example 1, to obtain polymers S4, S5, and S6, specifically:

example 4: the amount of sodium 2-acrylamido-2-methylpropanesulfonate with a structure represented by formula (I4) was 67.68 g, the amount of diallyl dimethyl ammonium chloride whose monomer B' with a structure represented by formula (IV) was 6.56 g, and the amount of methacryloylethylsulfobetaine whose monomer C' with a structure represented by formula (V1) was 5.68 g, to obtain polymer S4;

based on the total weight of the polymer S4, the content of the structural unit A in the polymer S4 was 84.7 wt %; the content of the structural unit B was 8.2 wt %; the content of the structural unit C was 7.1 wt %, and the weight-average molecular weight was 600,000.

Example 5: the amount of sodium 2-acrylamido-2-methylpropanesulfonate with a structure represented by formula (I4) was 42.72 g, the amount of diallyl dimethyl ammonium chloride whose monomer B' with a structure represented by formula (IV) was 20 g, and the amount of methacryloylethyl sulfobetaine whose monomer C' with a structure represented by formula (V1) was 17.28 g, to obtain a polymer S5;

based on the total weight of the polymer S5, the content of the structural unit A in the polymer S5 was 53.4 wt %; the content of the structural unit B is 25.0 wt %; the content of the structural unit C was 21.6 wt %, and the weight-average molecular weight was 440,000.

Example 6

The amount of sodium 2-acrylamido-2-methylpropanesulfonate with a structure represented by formula (I4) was 35.6 g, the amount of diallyl dimethyl ammonium chloride whose monomer B' with a structure represented by formula (IV) was 24 g, and the amount of methacryloylethyl sulfobetaine whose monomer C' with a structure represented by formula (V1) was 20.4 g, to obtain a polymer S6;

based on the total weight of the polymer S6, the content of the structural unit A in the polymer S6 was 44.5 wt %; the content of the structural unit B is 30 wt %; the content of the structural unit C was 25.5 wt %, and the weight-average molecular weight was 390,000.

Comparative Example 1

This comparative example was conducted in a similar manner to example 1 except that the methacryloylethylsulfobetaine with the structure represented by the formula (V1) was not added in this comparative example, that is, the monomer C' in example 1 was not added to give a polymer DS1;

the content of the structural unit A in the polymer DS1 was 79.4 wt % based on the total weight of the polymer DS1; the content of the structural unit B was 20.6 wt %, and the weight-average molecular weight was 570,000.

Comparative Example 2

This comparative example was conducted in a similar manner to example 1 except that in this comparative example, sodium 2-acrylamido-2-methylpropanesulfonate with the structure represented by the formula (I4), that is, monomer A' in example 1 was not added, to obtain polymer DS2;

based on the total weight of the polymer DS2, the content of the structural unit B in the polymer DS2 was 69.8 wt %; the content of the structural unit C was 30.2 wt %, and the weight-average molecular weight was 310,000.

Test Example

1. Structural Characterization

The infrared spectra of the polymers prepared in the above examples were tested and the invention illustratively provides an infrared spectrum of polymer S1 prepared in example 1, as shown in FIG. 1.

2. Observation of Appearance State of Polymer

The appearance of the polymer solution obtained in the above example was recorded and the specific observations were given in table 1.

TABLE 1

| 实例 | Example appearance State Observation |
|---|---|
| Example 1 | light yellow liquid |
| Example 2 | light yellow liquid |
| Example 3 | light yellow liquid |
| Example 4 | light yellow liquid |
| Example 5 | light yellow liquid |
| Example 6 | light yellow liquid |
| Comparative example 1 | light yellow liquid |
| Comparative example 2 | colorless liquid |

3. Evaluation of Polymer Dispersion Properties

The polymers obtained in each example were formulated into drilling fluid base mud as described above, and the drilling fluid base muds were tested for $\phi 6$, $\phi 3$ and API Fluid Loss (FLAPI), with the specific results shown in table 2.

TABLE 2

| Sample | $\phi 6$ | $\phi 3$ | $FL_{API}$/mL |
|---|---|---|---|
| High calcium bentonite base mud | 9 | 8 | 92.2 |
| High calcium bentonite base mud + Example 1 | 3 | 2 | 7.0 |
| High calcium bentonite base mud + Example 2 | 5 | 4 | 12.6 |
| High calcium bentonite base mud + Example 3 | 3 | 2 | 7.8 |
| High calcium bentonite base mud + Example 4 | 2 | 1 | 8.8 |
| High calcium bentonite base mud + Example 5 | 6 | 5 | 19.9 |
| High calcium bentonite base mud + Example 6 | 6 | 6 | 22.3 |
| High calcium bentonite base mud + comparative example 1 | 4 | 3 | 13.8 |
| High calcium bentonite base mud + comparative example 2 | 11 | 10 | 100.0 |

4. Evaluation of Water-Based Drilling Fluid Performance

The polymers prepared by the above examples were prepared into water-based drilling fluids, which were respectively marked as L1, L2, L3, L3, L5, L6, DL1 and DL2, and the viscosity, the temperature resistance and the high-temperature and high-pressure fluid loss of each water-based drilling fluid were tested, and the specific results were shown in Table 3.

TABLE 3

| Water-based drilling fluid number | test conditions | AV/mPa·s | PV/mPa·s | YP/Pa | $\phi 6/\phi 3$ | initial gel strength/ final gel strength Pa/Pa | $FL_{HTHP}$//mL |
|---|---|---|---|---|---|---|---|
| L1 | before aging | 66 | 56 | 10.22 | 6/5 | 3/3.5 | / |
|    | after aging  | 50.5 | 44 | 6.64 | 3/2 | 1.5/2.5 | 12.2 |
| L2 | before aging | 62.5 | 54 | 8.69 | 8/6 | 4/3 | / |
|    | after aging  | 48.5 | 44 | 4.60 | 6/5 | 3/3 | 15.8 |
| L3 | before aging | 63.5 | 53 | 10.73 | 5/4 | 2.5/3 | / |
|    | after aging  | 55.5 | 47 | 8.69 | 5/3 | 2/2 | 13.7 |
| L4 | before aging | 72 | 60 | 12.26 | 3/2 | 2/3.5 | / |
|    | after aging  | 66 | 58 | 8.18 | 5/4 | 3/5 | 14.4 |
| L5 | before aging | 60 | 51 | 9.20 | 9/7 | 4.5/6 | / |
|    | after aging  | 56.5 | 49 | 7.66 | 7/5 | 3/4 | 18.0 |
| L6 | before aging | 55 | 48 | 7.15 | 9/8 | 4.5/6.5 | / |
|    | after aging  | 50 | 46 | 4.09 | 7/5 | 3.5/4.5 | 22.2 |
| DL1 | before aging | 65 | 51 | 14.31 | 6/5 | 3/4 | / |
|     | after aging  | 50 | 48 | 2.04 | 2/1 | 0.5/0.5 | 33.2 |
| DL2 | before aging | 38.5 | 24 | 14.82 | 14/11 | 7/8 | / |
|     | after aging  | 37.5 | 25 | 12.78 | 13/10 | 6.5/6.5 | 60.0 |

Wherein, for the drilling fluid, AV was apparent viscosity, the larger AV represented the higher system viscosity, and the larger the molecular weight of the polymer was;

PV was plastic viscosity, and the bigger PV was, the stronger friction effect in the drilling fluid was;

YP was yield point, and the larger YP was, the stronger the grid structure of the internal space was when the drilling fluid flows;

$\phi 6$, $\phi 3$, the larger the initial gel strength and the final gel strength were, the stronger the grid structure of the internal space was when the drilling fluid was placed still, and the poorer the dispersion of the drilling fluid was reflected;

greater API fluid loss and high temperature and pressure fluid loss indicate d poorer fluid loss wall build of the drilling fluid.

The results showed that when the polymer provided by the invention is used for a water-based drilling fluid dispersant, the polymer has good compatibility with calcium salt, can maintain good hydration dispersion of the drilling fluid in a high-calcium environment, plays good roles in deflocculation and fluid loss reduction, and the obtained drilling fluid has good thermal stability.

The preferred embodiments of the present invention have been described above in detail, but the present invention is not limited thereto. Within the scope of the technical idea of the invention, many simple modifications can be made to the technical solution of the invention, including various technical features being combined in any other suitable way, and these simple modifications and combinations should also be regarded as the disclosure of the invention, and all fall within the scope of the invention.

The invention claimed is:

1. A calcium-resistant zwitterionic polymer, the polymer contains a structural unit A, a structural unit B and a structural unit C, the structural unit A is at least one selected from the group consisting of structural units having a structure represented by formula (11), a structure represented by formula (12), and a structure represented by formula (13); the structural unit B is a structural unit with a structure shown in a formula (2); the structural unit C is at least one selected from the group consisting of structural units having a structure represented by formula (31) and a structure represented by formula (32); the weight-average molecular weight of the polymer is 350,000 to 600,000;

formula (11)
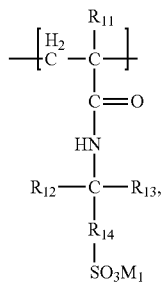

formula (12)
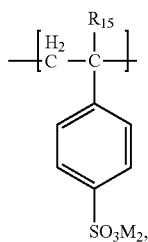

formula (13)
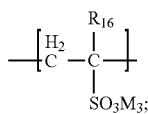

formula (2)
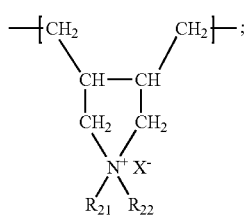

formula (31)
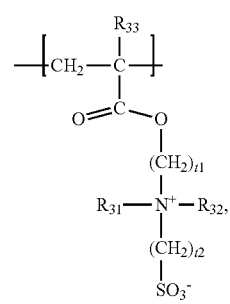

formula (32)
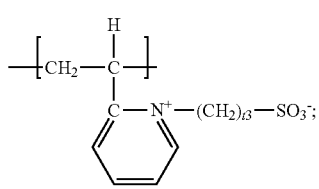

wherein, $R_{11}$, $R_{12}$, $R_{13}$, $R_{15}$ and $R_{16}$ in the formula (11), the formula (12) and the formula (13) are respectively and independently selected from H and $C_1$-$C_4$ alkyl, $R_{14}$ is selected from $C_1$-$C_4$ alkylene, $M_1$, $M_2$ and $M_3$ are respectively and independently Na or K;

in the formula (2), $R_{21}$ and $R_{22}$ are respectively and independently selected from $C_1$-$C_4$ alkyl, and $X^-$ is selected from $Cl^-$, $Br^-$, and $I^-$;

in the formula (31) and the formula (32), $R_{31}$ and $R_{32}$ are respectively and independently selected from $C_1$-$C_4$ alkyl, $R_{33}$ is selected from H and $C_1$-$C_4$ alkyl, and t1, t2 and t3 are respectively and independently integers of 1 to 6.

2. The polymer according to claim 1, wherein,
in formula (11), formula (12) and formula (13), $R_{11}$, $R_{12}$, $R_{13}$, $R_{15}$ and $R_{16}$ are respectively and independently selected from H, methyl, ethyl, n-propyl and isopropyl, $R_{14}$ is selected from $C_1$-$C_3$ alkylene, $M_1$, $M_2$ and $M_3$ are respectively and independently Na or K;
in formula (2), $R_{21}$ and $R_{22}$ are respectively and independently selected from methyl, ethyl, n-propyl and isopropyl, and $X^-$ is $Cl^-$ or $Br^-$;
in formula (31) and formula (32), $R_{31}$, $R_{32}$, and $R_{33}$ are respectively and independently selected from methyl, ethyl, n-propyl, and isopropyl, and t1, t2, and t3 are respectively and independently integers of 1 to 5.

3. The polymer according to claim 1, wherein the structural unit A is at least one selected from the group consisting of structural units having a structure represented by formula (14), a structure represented by formula (15), and a structure represented by formula (16); the structural unit B is a structural unit with a structure shown in a formula (4); the structural unit C is at least one selected from the group consisting of structural units having a structure represented by formula (51), a structure represented by formula (52), and a structure represented by formula (53);

formula (14)
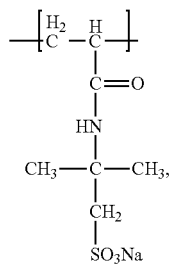

formula (15)
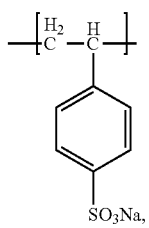

formula (16)
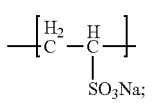

formula (4)
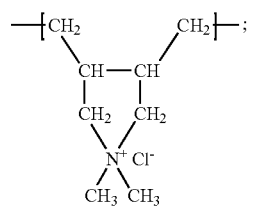

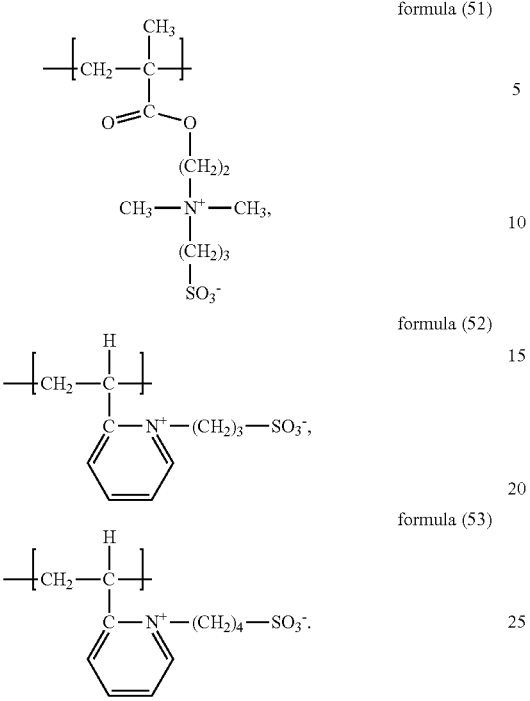

formula (51)

formula (52)

formula (53)

4. The polymer according to claim 1, wherein based on the total weight of the polymer, the content of the structural unit A is 53.4 wt % to 84.6 wt %; the content of the structural unit B is 8.2 wt % to 25 wt %; the content of the structural unit C is 7.1 wt % to 21.6 wt %;

the weight-average molecular weight of the polymer is 400,000 to 600,000.

5. A method of preparing a calcium-resistant zwitterionic polymer, the method comprises: carrying out polymerization reaction on each component in a polymeric composition in the presence of a cosolvent, a chain transfer agent and an initiator in an aqueous solvent and a protective atmosphere, wherein the polymeric composition contains a monomer A', a monomer B' and a monomer C';

the monomer A' is at least one selected from the group consisting of monomers having a structure represented by formula (I1), a structure represented by formula (I2), and a structure represented by formula (I3); the monomer B' is a monomer with a structure shown in a formula (II); the monomer C' is at least one selected from monomers with a structure shown in a formula (III1) and a structure shown in a formula (III2);

the monomer A', the monomer B' and the monomer C' are respectively such that the polymer contains a structural unit A, a structural unit B and a structural unit C, the structural unit A is at least one selected from the group consisting of structural units having a structure represented by formula (11), a structure represented by formula (12) and a structure represented by formula (13); the structural unit B is a structural unit with a structure shown in a formula (2); the structural unit C is at least one selected from the group consisting of structural units having a structure represented by formula (31) and a structure represented by formula (32); the amount of the polymeric composition used is such that the weight-average molecular weight of the polymer obtained is from 350,000 to 600,000;

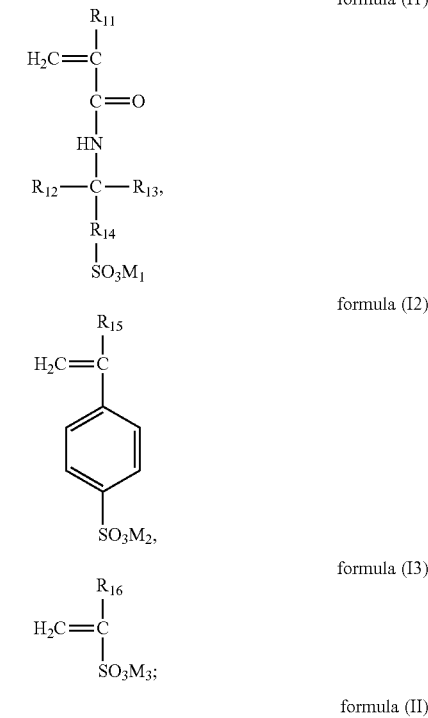

formula (I1)

formula (I2)

formula (I3)

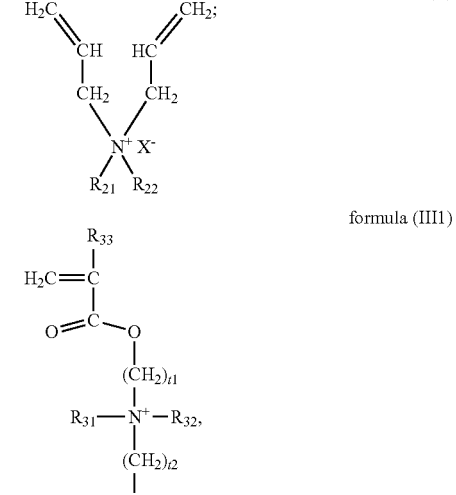

formula (II)

formula (III1)

formula (III2)

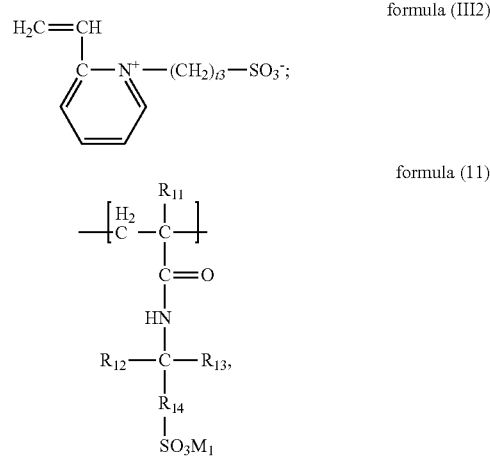

formula (11)

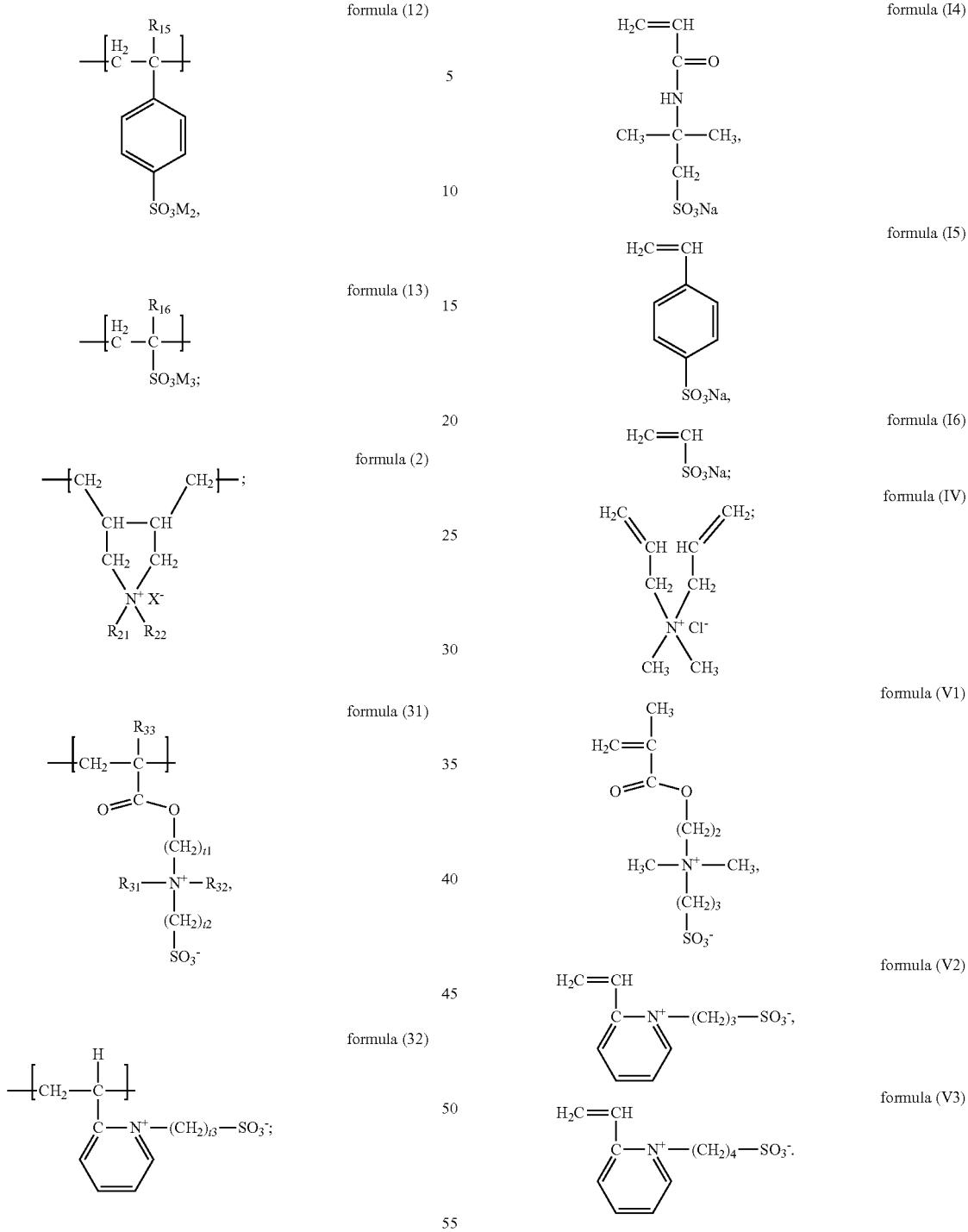

wherein each group is as defined in claim 1.

6. The method of claim 5, wherein the monomer A' is at least one selected from the group consisting of monomers having a structure represented by formula (I4), a structure represented by formula (I5), and a structure represented by formula (I6); the monomer B' is a monomer with a structure shown in a formula (IV); the monomer C' is at least one selected from the group consisting of monomers having a structure represented by formula (V1), a structure represented by formula (V2) and a structure represented by formula (V3);

7. The method according to claim 5, wherein the monomer A', the monomer B' and the monomer C' are used in such an amount that the polymer obtained has a content of the structural unit A of 53.4 wt % to 84.6 wt %; the content of the structural unit B is 8.2 wt % to 25.0 wt %; the content of the structural unit C is 7.1 wt % to 21.6 wt %, based on the total weight of the polymer;

the polymeric composition is used in an amount such that the polymer obtained has a weight-average molecular weight of 400,000 to 600,000.

8. The method of claim 5, wherein the cosolvent is at least one selected from soluble salts;

the cosolvent is at least one selected from ammonium chloride, sodium chloride and potassium chloride;

the chain transfer agent is at least one selected from sodium formate, potassium formate, sodium acetate, and potassium acetate;

the initiator is at least one selected from azo initiators, peroxide initiators, and redox initiators; the azo initiator is at least one selected from azobisisobutyramidine hydrochloride, azobisdiisopropylimidazoline hydrochloride, azobiscyanovaleric acid and azobisisopropylimidazoline; the peroxide initiator is at least one selected from hydrogen peroxide, ammonium persulfate, sodium persulfate and potassium persulfate; the redox initiator is at least one selected from persulfate-sulfite, persulfate-thiourea and persulfate-organic salt.

9. The method of claim 5, wherein the polymerization conditions comprises: the temperature is 45° C. to 75° C., and the time is 7 h to 10 h.

10. A water-based drilling fluid containing the polymer of claim 1 as a dispersant.

11. The drilling fluid of claim 10, wherein the water-based drilling fluid further comprises bentonite, calcium chloride, white asphalt, barite, and water.

12. The drilling fluid of claim 10, wherein in the water-based drilling fluid, relative to 100 parts by weight of water, the content of the bentonite is 1 to 2 parts by weight, the content of the calcium chloride is 10 to 15 parts by weight, the content of the white asphalt is 1 to 3 parts by weight, the content of the barite is 150 to 180 parts by weight, and the content of the polymer is 2.5 to 3 parts by weight.

\* \* \* \* \*